(12) United States Patent  
Kinnaird

(10) Patent No.: US 8,218,672 B2  
(45) Date of Patent: Jul. 10, 2012

(54) DIFFERENTIAL DATA TRANSCEIVER AND METHOD WITH REVERSED-WIRE IMMUNITY

(75) Inventor: Clark Douglas Kinnaird, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 784 days.

(21) Appl. No.: 12/328,834

(22) Filed: Dec. 5, 2008

(65) Prior Publication Data

US 2009/0279635 A1 Nov. 12, 2009

Related U.S. Application Data

(60) Provisional application No. 61/051,845, filed on May 9, 2008.

(51) Int. Cl.  
*H04L 25/49* (2006.01)

(52) U.S. Cl. ........ 375/287; 375/222; 375/219; 375/220; 375/286; 375/295; 375/316; 375/349

(58) Field of Classification Search .................. 375/287, 375/222, 219, 220, 286, 295, 316, 349  
See application file for complete search history.

(56) References Cited

U.S. PATENT DOCUMENTS

| | | | |
|---|---|---|---|
| 6,438,178 B1 * | 8/2002 | Lysdal et al. | 375/317 |
| 6,556,628 B1 * | 4/2003 | Poulton et al. | 375/257 |
| 7,541,760 B2 * | 6/2009 | Lin et al. | 318/400.01 |
| 7,825,697 B2 * | 11/2010 | Hsiung et al. | 327/34 |
| 2005/0266810 A1 * | 12/2005 | Drapkin et al. | 455/126 |
| 2007/0013323 A1 * | 1/2007 | De Oto | 315/291 |
| 2009/0251191 A1 * | 10/2009 | Li et al. | 327/309 |

* cited by examiner

*Primary Examiner* — Siu Lee  
(74) *Attorney, Agent, or Firm* — John J. Patti; Wade J. Brady, III; Frederick J. Telecky, Jr.

(57) ABSTRACT

A polarity independent differential data transceiver receives a differential voltage signal and outputs a first logic state when the differential voltage signal is in a positive voltage differential range and/or when the differential voltage signal is in a corresponding negative differential voltage range. The differential data transceiver will output a second logic state in response to receiving a voltage differential signal that is in an intermediate differential voltage range near zero between the positive differential voltage range and the corresponding negative differential voltage range.

14 Claims, 2 Drawing Sheets

US 8,218,672 B2

DIFFERENTIAL DATA TRANSCEIVER AND METHOD WITH REVERSED-WIRE IMMUNITY

RELATED APPLICATION

This application claims the benefit of U.S. Provisional Application No. 61/051,845, filed on May 9, 2008, which is incorporated by reference in its entirety herein.

TECHNICAL FIELD

This invention relates generally to data transceiver circuitry and more specifically to circuitry for sending and receiving data via differential voltages.

BACKGROUND

Various types of data transceivers, circuits or devices made to send and receive data, are generally known in the art. One type of data transceiver is a differential voltage transceiver. Differential voltage transceivers operate by providing a voltage difference over two conductors such that the data transceiver that receives the differential voltage signal can sense the differential voltage between the two conductors and assign a data value according to the differential voltage. Differential data transceivers send and receive data in a variety of applications such as point-of-sale terminals, factory automation, and automotive electronics. Certain standards control the communication protocols for different types of differential data transceivers, for example, the EIA-422 (RS-422), the ANSI TIA/EIA-485-A (RS-485), universal serial bus (USB), and IEC 11898-2 (CAN) standards. Each of these standards assigns logic values based on the threshold(s) of voltage sensed on the differential voltage line. If the differential voltage is above the threshold, for example, the assigned value is one state, and if the differential voltage is below the threshold, the assigned value is another state. Typically, a gray area of differential voltage range exists around the threshold(s) to account for noise and other tolerances.

During field installation of equipment using differential signaling, one common fault is the reversal of the two wires that carry the differential voltage. With existing transceivers, such an installation error causes data errors and/or complete communication stoppage because the received signals do not correspond to the intended or expected signal ranges. In many applications, this reversed wire fault is not detected until after installation of the system is complete, and correction of the miswiring is costly or impractical.

For example, in the RS-485 standard if the differential voltage on the wires carrying the signal is positive, the state is called "on" or binary logic zero. If the differential voltage is negative, the state is called "off" or binary logic one. If the differential voltage is near zero, the state is not defined. Should the signaling wires be reversed, however, the signals as received by the transceiver would be exactly reversed. In other words, the receiver would see a differential voltage that is positive when the intended signal is that the differential voltage is negative. Accordingly, the entire transmission for an RS-485 standard system will be reversed when wires are misconnected—all the zeros will be interpreted as ones and all the ones will be interpreted as zeros.

In another example, in a controller area network (CAN) differential driver standard circuit, if the differential voltages are positive the state is called "dominant," and if the differential voltage is near zero, the state is called "recessive". If the differential voltage is negative, the state is not defined or it may be interpreted as recessive. Thus, in CAN standard transceivers, the transmitted differential voltage signal is either positive or near zero. In the case of a reversed wire situation, however, the receiver will nearly only see negative signals or signals near zero. Accordingly, the receiver will only ever see a recessive state and never see a dominant state.

SUMMARY

Generally speaking, pursuant to these various embodiments, an example polarity independent differential data transceiver receives a differential voltage signal and outputs a first logic state when the differential voltage signal is in a positive voltage differential range and/or when the differential voltage signal is in a corresponding negative differential voltage range. The differential data transceiver should output a second logic state in response to receiving a voltage differential signal that is in an intermediate differential voltage range near zero between the positive differential voltage range and the corresponding negative differential voltage range.

So configured, the differential data transceiver should correctly interpret differential voltage signals regardless of the polarity of the wires that carry the differential voltage signal. For instance, if the transceiver sending the signal is configured to send or create a positive differential voltage for a first logic state and send a near-zero differential voltage signal for a second logic state, should the wires carrying the signal be reversed, the receiving transceiver should see the intended positive voltage signal as a negative voltage signal but still should interpret that signal as a first logic state. Therefore, wire reversal errors in equipment set-up should not impede the operation of the system. Moreover, additional training should not be necessary for the installers of such equipment to fix reversed wire errors or to detect and diagnose such errors. These and other benefits may become clearer upon making a thorough review and study of the following detailed description.

BRIEF DESCRIPTION OF THE DRAWINGS

For a more complete understanding of the invention, and the advantages thereof, reference is now made to the following descriptions taken in conjunction with the accompanying drawings, in which.

DETAILED DESCRIPTION OF THE PREFERRED EMBODIMENT(S)

Figure 1:
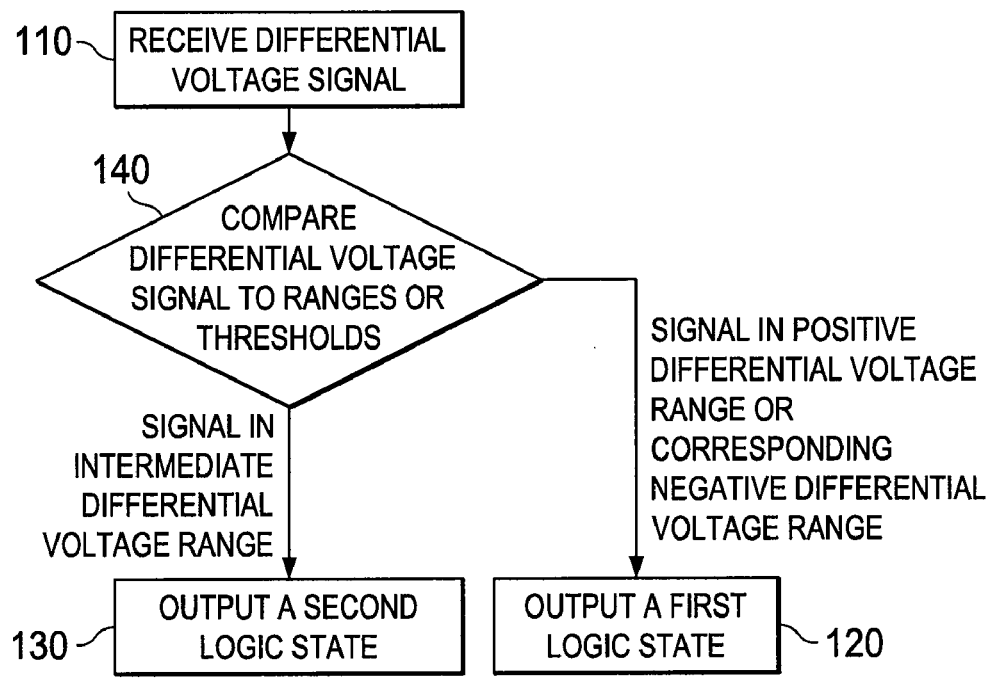
FIG. 1 comprises a flow diagram of a process as configured in accordance with various embodiments of the invention.

Referring to FIG. 1, one method of operating a differential data transceiver includes receiving at step 110 the different voltage signal. This step is typically performed by sensing a potential difference between two input lines by at least two comparator circuits. At step 120, the method includes outputting a first logic state in response to receiving the differential voltage signal in a positive differential voltage range and in response to receiving the differential voltage signal in a corresponding negative differential voltage range for the differential voltage signal. At step 130, the method includes outputting a second logic state in response to receiving the differential voltage signal in an intermediate differential voltage range between the positive differential voltage range and the corresponding negative differential voltage range. To output the first logic state at step 120 in response to receiving the differential voltage signal in the positive differential voltage range and in response to receiving the differential voltage signal in the corresponding negative differential voltage range for the differential voltage signal, the method includes at step 140 comparing the differential voltage signal to a first positive threshold and a second negative threshold. Then step 120 is performed, including outputting the first logic state in response to the differential voltage signal being more positive than the first positive threshold or more negative than the second negative threshold. To output the second logic state at step 130 in response to receiving the differential voltage signal in the intermediate differential voltage range between the positive differential voltage range and the corresponding negative differential voltage range, the method includes at step 140 comparing the differential voltage signal to a first positive threshold and a second negative threshold. Then step 130 is performed, including outputting the second logic state in response to the differential voltage signal being between the first threshold and the second threshold. The first threshold and the second threshold in this example define an intermediate differential voltage range.

Figure 2:
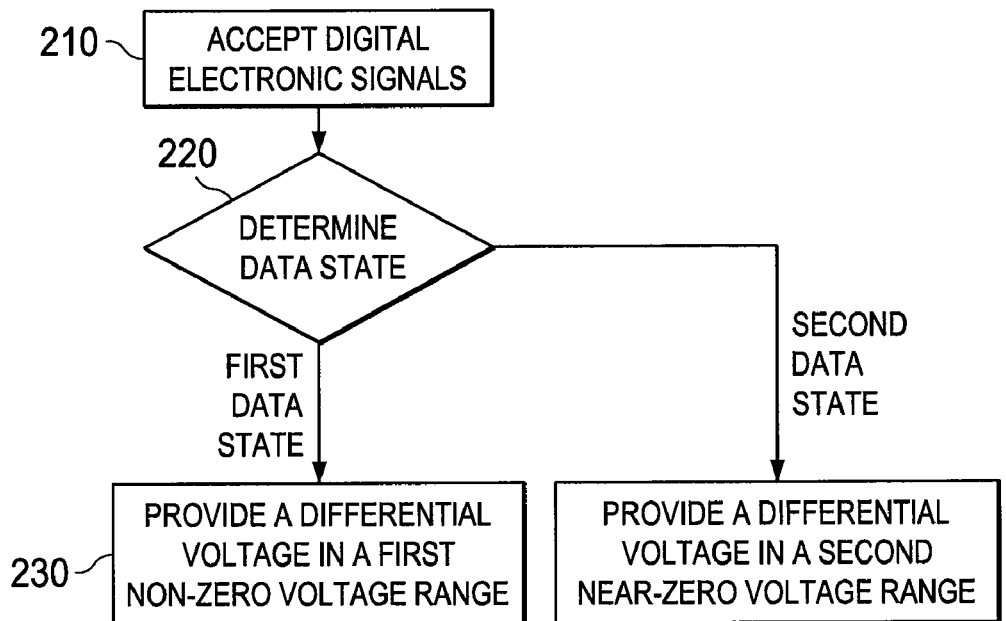
FIG. 2 comprises a flow diagram of a process as configured in accordance with various embodiments of the invention.

A differential data transceiver may also send data via a differential voltage based on the data states to be transmitted by the device. With reference to FIG. 2, this method of operation includes at step 210 accepting electronic signals comprising data to send and at step 220 determining the data states. The method then includes providing a differential voltage across two output lines corresponding to the data such that a first received data state results in a differential voltage in a first non-zero voltage range and a second received data state results in a differential voltage in a second near-zero voltage range. For example, at step 230, the method may include providing a differential voltage in a first non-zero voltage range when the data state is determined to be in a first data state such as logic binary state one. At step 240, the method may include providing a differential voltage in a second near-zero voltage range when the data state is determined to be a second data state such as logic binary state zero.

Figure 3:
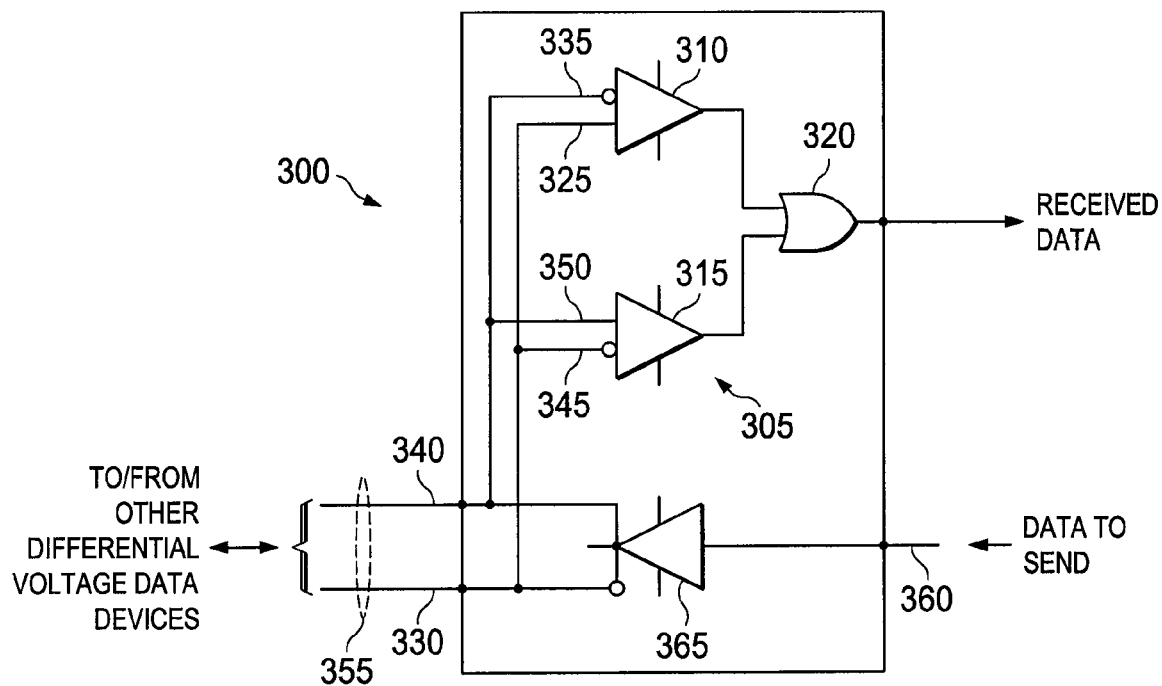
FIG. 3 comprises a circuit diagram of an example data transceiver as configured in accordance with various embodiments of the invention.

Referring now to FIG. 3, an illustrative approach to a circuit for performing the above described methods will now be provided. An example polarity independent differential data transceiver 300 includes a receiving circuit 305 comprising at least two comparator circuits 310 and 315 and a logic circuit 320. The logic circuit 320 is configured to provide a first logic signal in response to the transceiver's 300 receiving a differential voltage greater than about a first threshold away from zero and to provide a second logic signal in response to the transceiver's 300 receiving a differential voltage within about a second threshold away from zero. The two comparator circuits include a first comparator circuit 310 with a non-inverting input 325 operatively coupled to a first input line 330 and an inverting input 335 operatively coupled to a second input line 340. A second comparator circuit 315 includes an inverting input 345 operatively coupled to the first input line 330 and a non-inverting input 350 operatively coupled to the second input line 340. The logic circuit 320 is operatively coupled to the output of the comparator circuits 310 and 315. By one approach, the logic circuit 320 comprises a logic OR circuit. The OR circuit is configured to provide the first logic signal when at least one of the two comparator circuits 310 and 315 outputs a signal in response to sensing the differential voltage of at least about the first threshold away from zero. The logic circuit 320 comprised of an OR circuit is also configured to provide the second logic signal when both of the at least two comparator circuits 310 and 315 output a second signal in response to sensing the differential voltage within about the second threshold away from zero.

By another approach, a differential data transceiver includes a first comparator circuit 310 that outputs a first signal if an input differential voltage is greater than about a first threshold. The first comparator circuit 310 also outputs a second signal if the input differential voltage is less than about a second threshold. A second comparator circuit 315 outputs a third signal when the input differential voltage is less than about a negative first threshold, and the second comparator circuit 315 outputs a fourth signal when the input differential voltage is greater than about a negative second threshold.

In this approach, a logic circuit 320 receives signals from the first comparator circuit 310 and the second comparator circuit 315. The logic circuit 320 outputs a first logic signal if the input differential voltage is greater than about the first threshold or if the input differential voltage is less than about the negative threshold. The logic circuit 320 outputs a second logic signal if the input differential voltage is less than about the second threshold and greater than about the negative second threshold. For example, the logic circuit 320 may comprise an OR circuit configured to provide the first logic signal when at least one of the first comparator circuit 310 and the second comparator circuit 315 outputs the first signal. The OR circuit is configured to provide the second logic signal when both the first comparator circuit 310 and the second comparator circuit 315 outputs the second signal. The first comparator circuit 310 in this example has a non-inverting input 325 operatively coupled to a first input line 330 and an inverting input 335 operatively coupled to a second input line 320. The second comparator circuit 315 has an inverting input 345 operatively coupled to the first input line 330 and a non-inverting input 350 operatively coupled to the second input line 340.

Threshold voltages for a differential data transceiver described herein may be any voltages suitable for a given application. For example, a positive first threshold may be about 0.9 volts with a negative first threshold being about −0.9 volts. A positive second threshold may be about 0.5 volts and a negative second threshold may be about −0.5 volts. So configured, a first logic state such as digital logic state one would be assigned to differential voltage ranges of about 0.9 volts and above or about −0.9 volts and below. The second logic state such as digital logic state zero would be assigned to differential voltages between about 0.5 volts and about −0.5 volts. The ranges between about 0.5 volts and about 0.9 volts and between about −0.5 volts and about −0.9 volts for this example are indeterminate states set aside for noise and manufacturing tolerances.

The above approach will be compared to two sample prior approaches for differential voltage signaling. Table 1 below summarizes examples of signaling for the RS-485 standard in differential voltage signaling. Column 1 shows the logic signal to be sent by an RS-485 differential data transceiver. Column 2 shows the differential voltage sent by the transceiver for the corresponding logic signal, and this differential voltage is the expected differential voltage at a receiving RS-485 transceiver for the given logic signal. Column 2 also includes an example voltage as may be sent by an RS-485 differential data transceiver. Column 3 shows the differential voltage that is received when the conducting wires are reversed which is a common installation error for differential data transceiver systems. Column 3 also lists the corresponding example voltage as received by an RS-485 differential data transceiver corresponding to the voltage listed in column 2. Column 4 lists the logic signal as interpreted by the receiving RS-485 differential data transceiver installed with reversed wiring.

TABLE 1

RS-485 Standard

| Logic Signal Sent | Differential Voltage Sent and Expected (Example) | Differential Voltage Received with Reversed Wires (Example) | Logic Signal Received with Reversed Wires |
|---|---|---|---|
| 0 or ON | Greater than +0.2 (+0.5) | Less than −0.2 (−0.5) | 1 or OFF |
| Transition Zone | Between +0.2 and −0.2 | Between +0.2 and −0.2 | Not defined |
| 1 or OFF | Less than −0.2 (−0.5) | Greater than +0.2 (+0.5) | 0 or ON |

According to the table, the RS-485 standard uses a differential voltage of greater than positive 0.2 volts to correspond to a logic signal zero. When the wires conducting the differential voltage signal are reversed, however, the receiving RS-485 differential data transceiver receives signals that are less than about −0.2 volts. For example, should the sending RS-485 differential data transceiver receive a logic signal zero and send a differential voltage signal of about 0.5 volts corresponding to the logic signal zero, the receiving RS-485 differential data transceiver will receive a differential voltage of about −0.5 volts. The receiving differential data transceiver will therefore interpret the received signal as a logic signal one, which is exactly reversed of the intended signal. The RS-485 standard includes a transition zone for voltages between about 0.2 volts and about −0.2 volts. The receiving RS-485 differential data transceiver receiving signals in the transition zone interpret these signals as not defined when the wires are reversed and when the wires are properly installed. When a sending differential data transceiver operating under the RS-485 standard receives a logic signal one to send, then the transceiver sends a differential voltage of less than about −0.2 volts, for example, about −0.5 volts. Should the differential voltage wires be reversed, the receiving RS-485 differential data transceiver receives a voltage of greater than about 0.2 volts or, for example, about 0.5 volts. The receiving RS-485 differential data transceiver then interprets this differential voltage as a logic signal zero, which again, is the exact reverse of the intended signal.

Table 2 summarizes the logic signals and differential voltages for another known standard, the CAN standard. Table 2 includes columns that correspond to the columns of Table 1.

The CAN standard assigns a logic signal one, otherwise known as the dominant state, to a differential voltage range of greater than about 0.9 volts, for example, about 1.5 volts. Should the differential voltage wires be reversed, however, a receiving differential data transceiver operating under the CAN standard will see a differential voltage of less than about −0.9 volts, for example, about −1.5 volts. The receiving CAN standard differential data transceiver will interpret this information as either being not assigned or as the logic signal zero or recessive state. The CAN standard includes a transition zone defined between the differential voltages of about 0.9 volts and about 0.5 volts, for example, about 0.7 volts. A differential data transceiver receiving voltages in this range when installed with reverse wiring will actually receive voltages between about −0.9 volts and about −0.5 volts, for example, about −0.7 volts. The differential data transceiver operating under the CAN standard will interpret the signals to be a logic signal zero or recessive state. To send a logic signal zero or recessive state, the differential data transceiver operating under the CAN standard will send a differential voltage between about 0.5 volts and about −1.0 volts. Example voltages in this range include about −1.0 volts, about 0.2 volts, or about 0.6 volts. The differential data transceiver operating under the CAN standard that receives these voltages with reversed wiring, however, receives voltages between the range of about 1.0 volts and about −0.5 volts. For the examples of column 2, the CAN standard receiving differential data transceiver will receive signals of about 1.0 volts, about −0.2 volts, or about 0.6 volts, respectfully. In this range the CAN standard differential data transceiver may interpret these signals as the logic signal one, as not being defined, or as a logic signal zero depending on the voltage that was sent. Therefore, it can been seen that a differential data transceiver operating under the CAN standard with reverse wiring will

TABLE 2

CAN Standard

| Logic Signal Sent | Differential Voltage Sent and Expected (Example) | Differential Voltage Received with Reversed Wires (Example) | Logic Signal Received with Reversed Wires |
|---|---|---|---|
| 1 or Dominant | Greater than +0.9 (+1.5) | Less than −0.9 (−1.5) | Not defined or 0 |
| Transition Zone | Between +0.9 and +0.5 (+0.7) | Between −0.9 and −0.5 (−0.7) | 0 |
| 0 or Recessive | Between +0.5 and −1.0 (−1.0) or (+0.2) or (−0.6) | Between +0.1 and −0.5 (+1.0) or (−0.2) or (+0.6) | 1 or not defined or 0 depending on voltage used |
| Not Defined and Not Sent | Less than −1.0 | N/A | N/A | either only see the recessive state (logic signal zero) or a reversed state as compared to the intended signal.

Table 3 summarizes one example new approach to differential data communication. Columns in table 3 correspond to the columns of tables 1 and 2.

TABLE 3

Example New Symmetric Approach

| Logic Signal Sent | Differential Voltage Sent and Expected (Example) | Differential Voltage Received with Reversed Wires (Example) | Logic Signal Received with Reversed Wires |
|---|---|---|---|
| 1 or Active | Greater than +0.9 (+1.1) | Less than −0.9 (−1.1) | 1 or active |
| Transition Zone | Between +0.9 and +0.5 (+0.7) | Between −0.9 and −0.5 (−0.7) | Transition zone |
| 0 or Passive | Between +0.5 and −0.5 (+0.2) or (−0.2) | Between −0.5 and +0.5 (−0.2) or (+0.2) | 0 or passive |
| Transition Zone | Between −0.9 and −0.5 (−0.7) | Between +0.9 and +0.5 (+0.7) | Transition zone |
| 1 or Active | Less than −0.9 (−1.1) | Greater than +0.9 (+1.1) | 1 or active |

According to this example approach, when a logic signal one or active state is intended to be sent, the sending differential data transceiver sends a differential voltage of greater than about 0.9 volts, for example, about 1.1 volts. Should the differential voltage wires be reversed upon installation, however, the receiving differential data transceiver will receive a voltage range of less than negative 0.9 volts, or, for example, about negative 1.1 volts. In contrast to the prior systems, the receiving differential data transceiver operating under this arrangement will interpret this signal as a logic signal one or active, thus, still receiving the correct logic signal. This example includes a transition zone between about 0.9 volts and about 0.5 volts, for example, about 0.7 volts. Should the transmitting wires be reversed, the receiving differential data transceiver will receive corresponding differential voltages in the about −0.9 volt to about −0.5 volt range, for example, about −0.7 volts. The differential data received in this example still interprets this range to be within a transition zone.

In the logic signal zero or passive state, the differential data transceiver according to this example sends a differential voltage of between about 0.5 volts and about −0.5 volts. Should the wires be reversed, the receiving differential data transceiver will receive a signal between about −0.5 volts and about 0.5 volts. In other words, even with reversed wires, the signal sent corresponding to a digital logic zero or passive state is still within the digital logic zero or passive state range such that the signal is interpreted correctly. Another transition zone is set between about −0.9 volts and about −0.5 volts corresponding to the transition zone of the same voltage range on the positive side. Voltages less than about −0.9 volts such as about −1.1 volts are assigned to a logic signal one or active state. Thus, should the wires be reversed, the receiving differential data transceiver will receive voltages within the range of about 0.9 volts, such as about 1.1 volts, and still interpret the data as a logic signal one or active state. So configured, the output of the differential data transceiver under this example is not affected by a reversal of the wires carrying the differential voltage signal to the receiving differential data transceiving device.

Table 4 below sets forth one example of the logic signals provided by the first comparator circuit 310, the second comparator circuit 315, and the logic circuit 320 for the example differential voltages discussed above. A first comparator circuit 310 and a second comparator circuit 315 are configured to each compare the received differential voltage to two different thresholds. In this example, the first comparator circuit 310 outputs a first signal designated as a "1" if the differential voltage is greater than or equal to about 0.9 volts, and the first comparator circuit 310 outputs a second signal designated as a "0" if the differential voltage is less than or equal to about 0.5 volts. The second comparator circuit 315 is configured to output a first signal designated with a "1" if the differential voltage is less than or equal to about −0.9 volts and to output a second signal designated with a "0" if the differential voltage is greater than or equal to about −0.5 volts. Based on these parameters, the differential data transceiver logic circuit 320 will operate according to the figures set forth in Table 4.

TABLE 4

Example New Approach

| Differential Voltage | Comparator Circuit 310 | Comparator Circuit 315 | Logic Circuit 320 |
|---|---|---|---|
| Greater than 0.9 | 1 | 0 | 1 |
| Between 0.9 and 0.5 | ? | 0 | ? |
| Between −0.5 and 0.5 | 0 | 0 | 0 |
| Between −0.9 and −0.5 | 0 | ? | ? |
| Less than −0.9 | 0 | 1 | 1 |

More specifically, when the differential voltage is greater than about 0.9 volts, the first comparator circuit 310 will output a first signal designated with a "1." The second comparator circuit 315 will output a second signal "0" because the differential voltage is greater than or equal to about −0.5 volts. The logic circuit 320 in this situation will output a first logic state designated with a "1" because one of the first comparator circuit 310 and the second comparator circuit 315 outputted the first signal "1". If the differential voltage is between 0.9 volts and 0.5 volts, the first comparator circuit 310 does not provide a determinant output because the differential voltage lies in a gray area or transition zone not defined for that comparator circuit even though the second comparator circuit 315 outputs the second signal because the differential voltage is still greater than or equal to about −0.5 volts. In this circumstance, the logic circuit 320 outputs no determinant signal because the signal from the comparator circuit 310 is indeterminate. If the differential voltage is between negative 0.5 volts and positive 0.5 volts, the first comparator circuit 310 outputs a second signal designated with a "0" because the differential voltage is less than about 0.5 volts. The second comparator circuit 315 also outputs a "0" because the differential voltage is greater than or equal to about −0.5 volts. The circuit 320 then outputs a second logic signal designated with a "0" because neither the first comparator circuit 310 nor the second comparator circuit 315 outputted a first signal "1".

If the differential voltage is between negative 0.9 volts and negative 0.5 volts, the first comparator circuit 310 outputs a second signal "0" because the differential voltage is less than 0.5 volts. The second comparator circuit 315 outputs an indeterminant state because the differential voltage lies in the transition zone that is undefined for the second comparator circuit 315. In this situation the logic circuit 320 fails to provide a determinant output because it fails to receive a determinant signal from the second comparator circuit 315. If the differential voltage is less than about −0.9 volts, the first comparator circuit 310 outputs a "0" because the differential voltage is less than about 0.5 volts. The second comparator circuit 315 outputs a first signal designated with a "1" because the differential voltage is less than or equal to negative 0.9 volts. Here, the logic circuit 320 outputs a first digital logic state designated a "1" because one of the first comparator circuit 310 and the second comparator circuit 315 outputs the first signal. The voltages set for the various thresholds may be varied according to a given application. For example, the positive first threshold may be 0.5 volts with the negative first threshold being set to about −0.5 volts. In this example the positive second threshold is 0.2 volts and the negative second threshold is about −0.2 volts. Accordingly, the voltage levels may be set as needed.

With reference again to FIG. 3, a differential data transceiver includes a send/receive port 355 having at least two pins 330 and 340 to communicate a differential voltage. The differential data transceiver also includes a driver input port 360 and a differential driver circuit 365 that receives data from the driver input port 360 and that provides voltage levels at the send/receive port 355 based at least in part on the data received from the driver input port 360. In this manner, digital data received via the driver input port 360 is converted into differential voltage signals that are provided to the send/receive port 355 via the differential driver circuit 365.

By one approach, the differential driver circuit 365 includes a controller area network ("CAN") differential driver circuit, which is known in the art. This differential driver circuit 365 may also include driver current limiting circuitry 367, as is known in the art, configured to limit the current on the send/receive port 355 to about 250 milliamps or about 150 milliamps, although other limits are possible. So configured, such a differential data transceiver has current limits and other operation configurations that match either the CAN, RS-485, or RS-422 standards such that the data transceivers may be used in a variety of systems without substantial overhaul of the typical system's configuration.

A receiver circuit 305 receives signals from the send/receive port 355. The receiver circuit 305 includes the first comparator circuit 310 and the second comparator circuit 315 operatively coupled to a logic circuit 320. By one approach, the first comparator circuit 310 and the second receiver circuit 315 comprise CAN receiver circuits as are known in the art. In one example, the receiver circuit 305 includes a first comparator circuit 310 that outputs a first signal if a differential voltage on the send/receive port 355 is greater than about a first positive threshold and that outputs a second signal if the differential voltage on the send/receive port 355 is less than about a positive second threshold. The receiver circuit 305 of this example includes a second comparator circuit 315 that outputs a third signal if the differential voltage on the send/receive port 355 is less than about a negative first threshold and that outputs a fourth signal if the differential voltage on the send/receive port 355 is greater than about a negative second threshold. The logic circuit 320 is adapted to receive the first, second, third, and fourth signals from the first comparator circuit 310 and the second comparator circuit 315. The logic circuit 320 outputs a first logic signal if the differential voltage on the send/receive port 355 is greater than about the positive first threshold and less than about a negative first threshold. The logic circuit 320 outputs a second logic signal if the differential voltage on the send/receive port 355 is less than about the positive second threshold and if the differential voltage on the send/receive port 355 is greater than about the negative second threshold.

Figure 4:
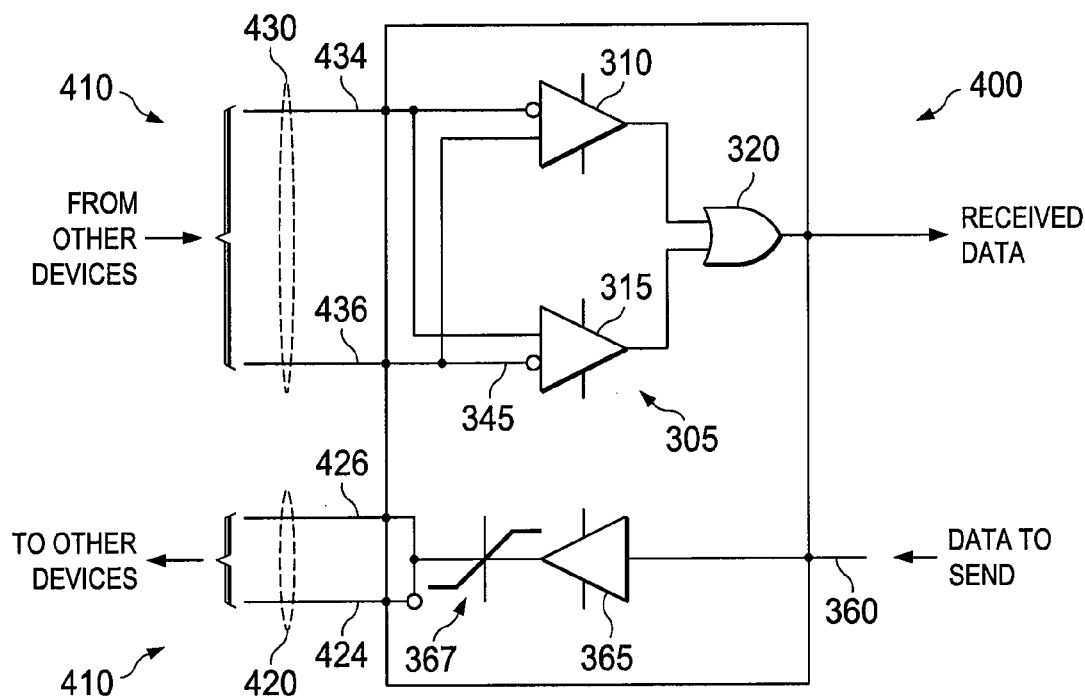
FIG. 4 comprises a circuit diagram of an example data transceiver as configured in accordance with various embodiments of the invention.

With reference to FIG. 4, the differential data transceiver 400 may include a send/receive port 410 that includes at least two pins to send or receive differential voltages. In this example, a send port 420 has two pins, 424 and 426 to send differential voltages. The receive port 430 has two pins, 434 and 436 to receive differential voltages. In this arrangement, signals may be sent bilaterally at the same time in contrast to a different type of differential data transceiver as shown in, for example, FIG. 3 where communications must be modulated over the send/receive port.

Those skilled in the art will recognize that a wide variety of modifications, alterations, and combinations can be made with respect to the above described embodiment without departing from the scope of the invention.

What is claimed is:

1. A differential data transceiver comprising:
   a first comparator circuit that outputs a first signal if an input differential voltage is greater than about a first threshold and that outputs a second signal if the input differential voltage is less than about a second threshold;
   a second comparator circuit that outputs a third signal when the input differential voltage is less than about a negative first threshold and that outputs a fourth signal when the input differential voltage is greater than about a negative second threshold; and
   a logic circuit that receives signals from the first comparator circuit and the second comparator circuit, wherein the logic circuit output:
      a first logic signal if the input differential voltage is greater than about the first threshold or if the input differential voltage is less than about the negative first threshold;
      a second logic signal if the input differential voltage is less than about the second threshold and greater than about the negative second threshold.

2. The differential data transceiver of claim 1 wherein the logic circuit comprises an OR circuit.

3. The differential data transceiver of claim 1 wherein the first comparator circuit has a non-inverting input operatively coupled to a first input line and has an inverting input operatively coupled to a second input line.

4. The differential data transceiver of claim 1 wherein the second comparator circuit has an inverting input operatively coupled to a first input line and has a non-inverting input operatively coupled to a second input line.

5. The differential data transceiver of claim 1 further comprising driver current limit circuitry configured to limit current to about 250 milliamps or about 150 milliamps.

6. A differential data transceiver comprising:
   a send/receive port having at least two pins to communicate a differential voltage;
   a driver input port;
   a differential driver circuit that receives data from the driver input port and that provides voltage levels at the send/receive port based at least in part on the data received from the driver input port;

a receiver circuit that receives signals from the send/receive port, wherein the receiver circuit includes:

a first comparator circuit that outputs a first signal if the differential voltage on the send/receive port is greater than about a positive first threshold and that outputs a second signal if the differential voltage on the send/receive port is less than about a positive second threshold;

a second comparator circuit that outputs a third signal if the differential voltage on the send/receive port is less than about a negative first threshold and that outputs a fourth signal when the differential voltage on the send/receive port is greater than about a negative second threshold; and a logic circuit that is adapted to receive the first, second, third, and fourth signals from the first comparator circuit and the second comparator circuit, wherein the logic circuit outputs:

a first logic signal if the differential voltage on the send/receive port is greater than about the positive first threshold and less than about the negative first threshold; and a second logic signal if the differential voltage on the send/receive port is less than about the positive second threshold and greater than about the negative second threshold.

7. The differential data transceiver of claim 6, wherein the two pins further comprise:

a first input line operatively coupled to at least one of the two pins; and a second input line operatively coupled to at least one of the two pins.

8. The differential data transceiver of claim 7, wherein the first comparator circuit has a non-inverting input operatively coupled to the first input line and has an inverting input operatively coupled to the second input line.

9. The differential data transceiver of claim 7, wherein the second comparator circuit has an inverting input operatively coupled to the first input line and has a non-inverting input operatively coupled to the second input line.

10. The differential data transceiver of claim 6, wherein the positive first threshold is about 0.9 volts, the negative first threshold is about −0.9 volts, the positive second threshold is about 0.5 volts, and the negative second threshold is about −0.5 volts.

11. The differential data transceiver of claim 6, wherein the positive first threshold is about 0.5 volts, the negative first threshold is about −0.5 volts, the positive second threshold is about 0.2 volts, and the negative second threshold is about −0.2 volts.

12. The differential data transceiver of claim 6, wherein the transceiver further comprises driver current limit circuitry configured to limit current to about 250 milliamps or about 150 milliamps.

13. The differential data transceiver of claim 6 wherein the differential driver circuit further comprises a controller area network (CAN) differential driver circuit.

14. The differential data transceiver of claim 6, wherein the send/receive port further comprises:

a send port having two pins to send differential voltages; and a receive port having two pins to receive differential voltages.

* * * * *